US012589299B2

(12) United States Patent
Michailidis

(10) Patent No.: US 12,589,299 B2
(45) Date of Patent: Mar. 31, 2026

(54) GRAPHICS RENDERING APPARATUS AND METHOD

(71) Applicant: Sony Interactive Entertainment Inc., Tokyo (JP)

(72) Inventor: Lazaros Michailidis, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 273 days.

(21) Appl. No.: 18/484,696

(22) Filed: Oct. 11, 2023

(65) Prior Publication Data

US 2024/0131428 A1 Apr. 25, 2024
US 2024/0226735 A9 Jul. 11, 2024

(30) Foreign Application Priority Data

Oct. 21, 2022 (GB) ...................................... 2215602

(51) Int. Cl.
*A63F 13/52* (2014.01)
*A63F 13/58* (2014.01)
(Continued)

(52) U.S. Cl.
CPC .............. *A63F 13/52* (2014.09); *A63F 13/58* (2014.09); *G06T 11/00* (2013.01); *G06T 13/00* (2013.01); *G06T 2210/44* (2013.01)

(58) Field of Classification Search
CPC .......... A63F 13/52; A63F 13/42; A63F 13/63; A63F 2300/66
See application file for complete search history.

(56) References Cited

U.S. PATENT DOCUMENTS 6,804,635 B1 * 10/2004 Dhondt ................... G06T 17/20
703/2
8,692,827 B1 * 4/2014 Guskov ................... G06T 19/20
345/423
(Continued)

FOREIGN PATENT DOCUMENTS

CN 114419211 A 4/2022
KR 20210050402 A 5/2021

OTHER PUBLICATIONS

Extended European Search Report for corresponding EP Application No. 23200106.5, 8 pages, dated Feb. 28, 2024.
(Continued)

*Primary Examiner* — Chase E Leichliter
(74) *Attorney, Agent, or Firm* — Fish & Richardson P.C.

(57) ABSTRACT

A graphics rendering apparatus, comprising: a first receiving unit configured to receive mesh data comprising a mesh that defines a geometry of a virtual element that is comprised within a virtual environment of a video game; a second receiving unit configured to receive one or more input signals; an animation unit configured to cause the virtual element to perform a given predefined action in response to one or more of the input signals; a determination unit configured to determine whether the virtual element has performed the given predefined action at least a threshold number of times; an identification unit configured to identify one or more predefined mesh deformations associated with the given predefined action if the virtual element has performed the given predefined action at least the threshold number of times; a deformation unit configured to deform one or more subsets of the mesh in accordance with one or more of the predefined mesh deformations, and at least in part thereby generate subsequent mesh data comprising a subsequent mesh that defines a subsequent geometry of the (Continued)

virtual element; and a rendering unit configured to render the virtual element based on the subsequent mesh data.

20 Claims, 5 Drawing Sheets

(51) Int. Cl.
G06T 11/00 (2006.01)
G06T 13/00 (2011.01)

(56) References Cited

U.S. PATENT DOCUMENTS

| | | | | |
|---|---|---|---|---|
| 9,737,811 | B1 * | 8/2017 | Penmatsa | A63F 13/35 |
| 10,217,278 | B1 * | 2/2019 | Penmatsa | A63F 13/52 |
| 10,300,382 | B1 * | 5/2019 | Penmatsa | G06T 17/05 |
| 10,726,611 | B1 * | 7/2020 | Court | G06T 15/503 |
| 10,984,587 | B2 * | 4/2021 | Duka | A63F 13/85 |
| 11,426,664 | B1 * | 8/2022 | Snethen | A63F 13/822 |
| 11,704,868 | B2 * | 7/2023 | Loodin Ek | A63F 13/63 |
| | | | | 345/418 |
| 2001/0003708 | A1 * | 6/2001 | Aizu | A63F 13/537 |
| | | | | 463/7 |
| 2001/0007825 | A1 | 7/2001 | Harada | |
| 2007/0035831 | A1 * | 2/2007 | Gutierrez Novelo | A63F 13/40 |
| | | | | 359/465 |
| 2011/0306414 | A1 * | 12/2011 | McNeely | A63F 13/63 |
| | | | | 463/31 |
| 2014/0163930 | A1 * | 6/2014 | Balon | A63F 13/12 |
| | | | | 703/1 |
| 2014/0267230 | A1 * | 9/2014 | Osuna | A63F 13/58 |
| | | | | 345/419 |
| 2015/0091906 | A1 * | 4/2015 | Dishno | G06F 16/9577 |
| | | | | 345/427 |
| 2015/0206345 | A1 * | 7/2015 | Chang | G06T 17/20 |
| | | | | 345/423 |
| 2016/0267705 | A1 * | 9/2016 | O'Leary | G06T 19/20 |
| 2017/0053457 | A1 * | 2/2017 | Thompson | G06F 3/04815 |
| 2017/0061037 | A1 * | 3/2017 | Makem | G06F 30/23 |
| 2018/0031719 | A1 * | 2/2018 | Huang | G06T 17/20 |
| 2018/0065058 | A1 * | 3/2018 | LaCrosse | A63F 13/80 |
| 2018/0068574 | A1 * | 3/2018 | LaCrosse | G09B 5/06 |
| 2018/0089882 | A1 | 3/2018 | Alkouh | |
| 2018/0122140 | A1 * | 5/2018 | Janzer | G06T 19/00 |
| 2018/0122148 | A1 | 5/2018 | Janzer | |
| 2018/0330096 | A1 * | 11/2018 | Breindel | A63F 13/352 |
| 2019/0197765 | A1 * | 6/2019 | Molyneaux | G06T 7/187 |
| 2019/0240581 | A1 * | 8/2019 | Walker | A63F 13/533 |
| 2020/0118349 | A1 * | 4/2020 | Amimoto | A63F 13/63 |
| 2020/0226799 | A1 * | 7/2020 | Pease | G06T 11/001 |
| 2020/0316465 | A1 * | 10/2020 | Wan | A63F 13/69 |
| 2020/0364945 | A1 * | 11/2020 | Lin | A63F 13/533 |
| 2020/0368616 | A1 * | 11/2020 | Delamont | H04N 13/239 |
| 2024/0131428 | A1 * | 4/2024 | Michailidis | A63F 13/58 |
| 2024/0226735 | A9 * | 7/2024 | Michailidis | G06T 13/00 |
| 2024/0399249 | A1 * | 12/2024 | Xiong | A63F 13/69 |

OTHER PUBLICATIONS

Li Lin, et al., "A Rapid Method of 3D Character Models' Diversity Used Micro-deformation," Computer-Aided Design and Computer Graphics (CAD/GRAPHICS), 12th International Conference on, IEEE, pp. 313-316, Sep. 15, 2011 (for relevancy, see Non-Pat. Lit, #1).

Combined Search and Examination Report for corresponding GB Application No. GB2215602.0, 6 pages, dated Apr. 28, 2023.

* cited by examiner

Before

After

Perform predefined action at least a
threshold number of times

During

GRAPHICS RENDERING APPARATUS AND METHOD

FIELD OF INVENTION

The present invention relates to a graphics rendering apparatus and method.

BACKGROUND

The popularity of multi-player video games has increased in recent years. Such multi-player video games allow users to connect with other users while completing certain achievements or challenges within the video game. For example, in order to complete certain achievements or challenges within a multi-player video game, two or more users may need to co-operate with each other. For example, the two or more users may need to help each other in order to overcome a certain obstacle or defeat a mutual enemy. In other examples, completing certain achievements or challenges may require the two or more users to compete with each other. For example, the two or more users may be split into two or more teams, and the challenge is to obtain more points, kills, goals, etc. than the other team.

Users of a multi-player video game typically interact with the game environment by way of an avatar; an in-game character which the user may control using their video game controller, or keyboard and mouse, for example. During the game, users can upgrade their respective avatar's in-game statistics (strength level, health level, stamina level, magic level, or the like) by completing certain achievements or challenges. However these avatar upgrades are typically not apparent to other users of the video game. For example, if a first user were to upgrade their avatar's strength level, a second user may not readily perceive that such an upgrade has occurred. This may lead to user frustration within the game; the second user may decide to attack the first user's avatar in the erroneous belief that the first user's avatar is weaker than their own avatar when, in fact, the converse is true, for example. The second user may therefore become frustrated after being beaten by the first user, as it was only after the battle began that the second user became aware of the first user's avatar's true strength.

The present invention seeks to alleviate or mitigate this issue.

SUMMARY OF THE INVENTION

In a first aspect, a graphics rendering apparatus is provided in claim 1.

In another aspect, a graphics rendering method is provided in claim 10.

Further respective aspects and features of the invention are defined in the appended claims.

BRIEF DESCRIPTION OF THE DRAWINGS

Embodiments of the present invention will now be described by way of example with reference to the accompanying drawings, in which.

DESCRIPTION OF THE EMBODIMENTS

A graphics rendering apparatus and method are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

In an example embodiment of the present invention, an entertainment system is a non-limiting example of such a graphics rendering apparatus.

Figure 1:
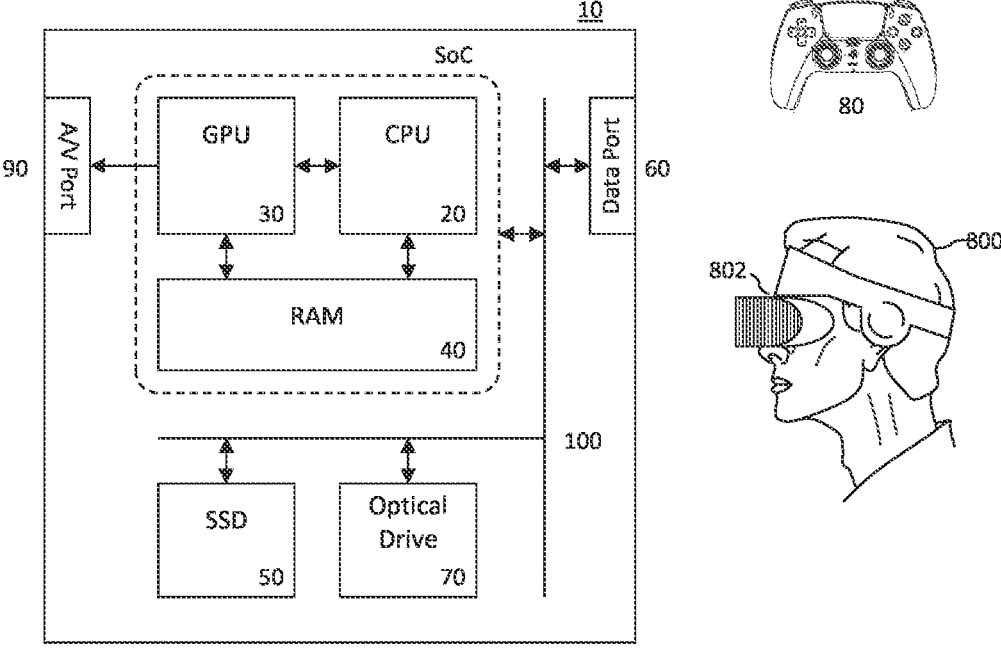
FIG. 1 schematically illustrates an entertainment system operable as a graphics rendering apparatus according to embodiments of the present description.

Referring to FIG. 1, an example of an entertainment system 10 is a computer or console such as the Sony® PlayStation 5 ® (PS5).

The entertainment system 10 comprises a central processor 20. This may be a single or multi core processor, for example comprising eight cores as in the PS5. The entertainment system also comprises a graphical processing unit or GPU 30. The GPU can be physically separate to the CPU, or integrated with the CPU as a system on a chip (SoC) as in the PS5.

The entertainment device also comprises RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive, or an internal solid state drive as in the PS5.

The entertainment device may transmit or receive data via one or more data ports 60, such as a USB port, Ethernet® port, WiFi® port, Bluetooth® port or similar, as appropriate. It may also optionally receive data via an optical drive 70.

Interaction with the system is typically provided using one or more handheld controllers 80, such as the DualSense® controller in the case of the PS5.

Audio/visual outputs from the entertainment device are typically provided through one or more A/V ports 90, or through one or more of the wired or wireless data ports 60.

Where components are not integrated, they may be connected as appropriate either by a dedicated data link or via a bus 100.

An example of a device for displaying images output by the entertainment system is a head mounted display 'HMD' 802, worn by a user 800.

As mentioned previously, a second user may not readily perceive that a first user's avatar has been upgraded. This inability to perceive avatar upgrades may be inconvenient for the second user; the second user may not be able to make informed decisions regarding the manner in which they should interact with the first user's avatar (whether to attack or evade the first user's avatar, for example). Meanwhile a solution such as having a strength or stamina bar floating above the player can be distracting and, particularly for games that strive to appear realistic, disrupt the visual integrity of the virtual environment within the game.

Graphics Rendering Apparatus

The aforementioned problem may be alleviated or mitigated by implementing means to modify the appearance of avatars (or indeed any other virtual element of the video game) in response to activity performed by the avatars (or virtual elements). The modified appearance of the avatar (or virtual element) may provide an indication to users of the current state of the avatar. These users may thus be able to make a more informed decision regarding the manner in which they interact with the avatar, thereby improving user convenience and/or reducing user dissatisfaction, whilst at the same time preserving the visual integrity of the virtual environment.

Figure 2:
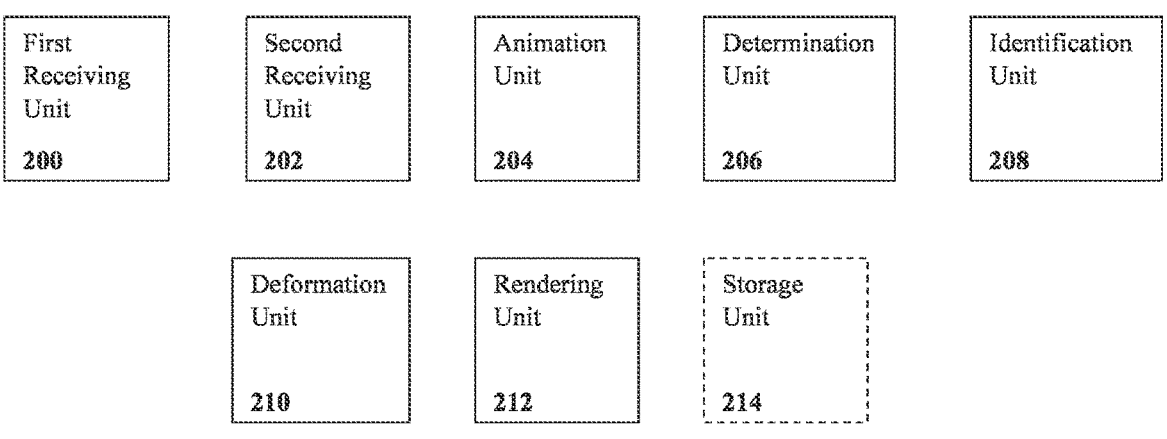
FIG. 2 schematically illustrates a graphics rendering apparatus according to embodiments of the present description.

Accordingly, turning now to FIG. 2, in embodiments of the present description a graphics rendering apparatus comprises first receiving unit 200 is configured to receive mesh data comprising a mesh that defines a geometry of a virtual element that is comprised within a virtual environment of a video game; a second receiving unit 202 configured to receive one or more input signals; an animation unit 204 configured to cause the virtual element to perform a given predefined action in response to one or more of the input signals; a determination unit 206 configured to determine whether the virtual element has performed the given predefined action at least a threshold number of times; an identification unit 208 configured to identify one or more predefined mesh deformations associated with the given predefined action if the virtual element has performed the given predefined action at least the threshold number of times; a deformation unit 210 configured to deform one or more subsets of the mesh in accordance with one or more of the predefined mesh deformations, and at least in part thereby generate subsequent mesh data comprising a subsequent mesh that defines a subsequent geometry of the virtual element; and a rendering unit 212 configured to render the virtual element based on the subsequent mesh data.

Figure 3:
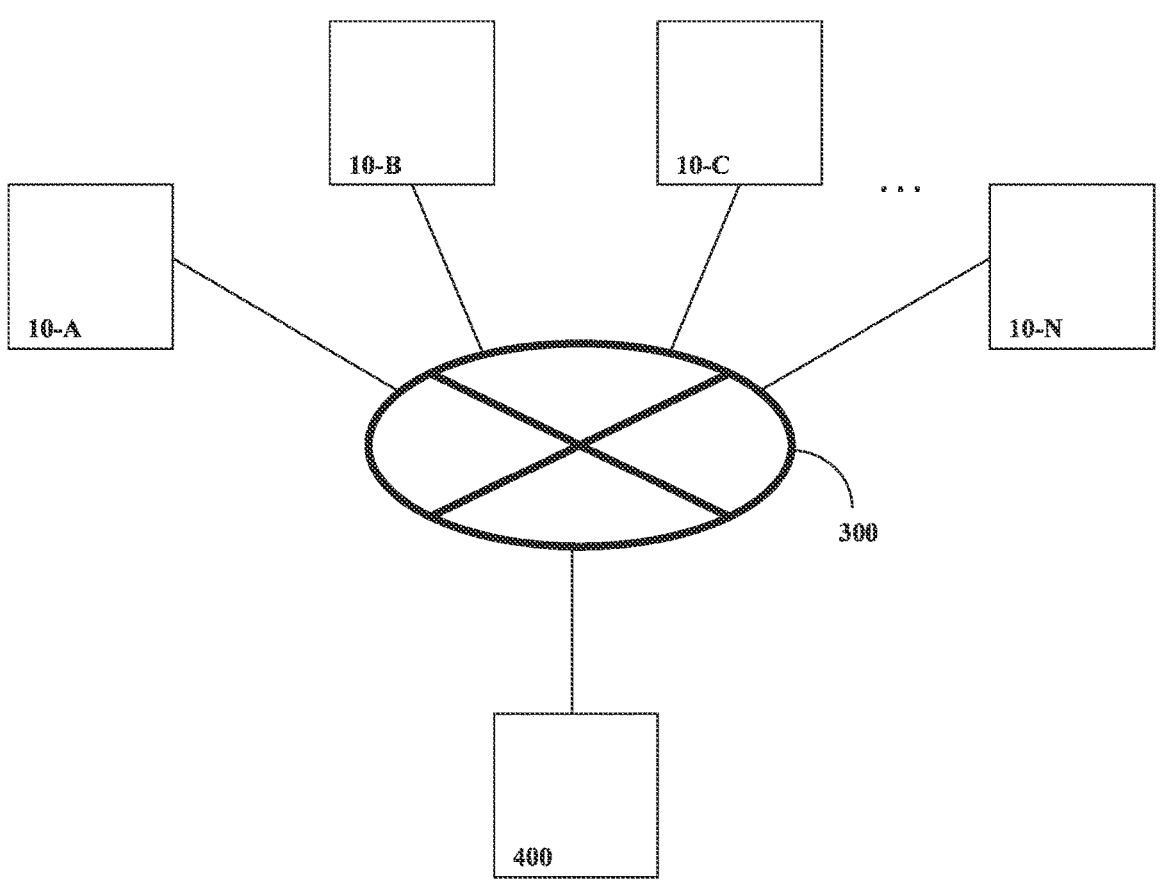
FIG. 3 schematically illustrates a network environment.

Multi-player video games are typically hosted via a network such as LAN, WLAN, the Internet, P2P networks, or the like. FIG. 3 depicts a typical network environment for a multi-player video game, in which game server 400 is connected to a plurality of client devices (entertainment devices) 10-A to 10-N via network 300. It should be noted that client devices need not only take the form of an entertainment device (such as a PS5), but may also include telephones, computers, televisions, or any other device capable of connecting to a network.

Therefore, and as will be appreciated by persons skilled in the art, the graphics rendering apparatus may potentially be implemented by any device (or combination of devices) involved in the generation or administration of the multi-player video game, such as the entertainment device 10 (whether in a P2P structure, or operating as either a client or server, either as a real or virtualised device), or a dedicated server for example provided by the publishers of the video game.

Figure 4:
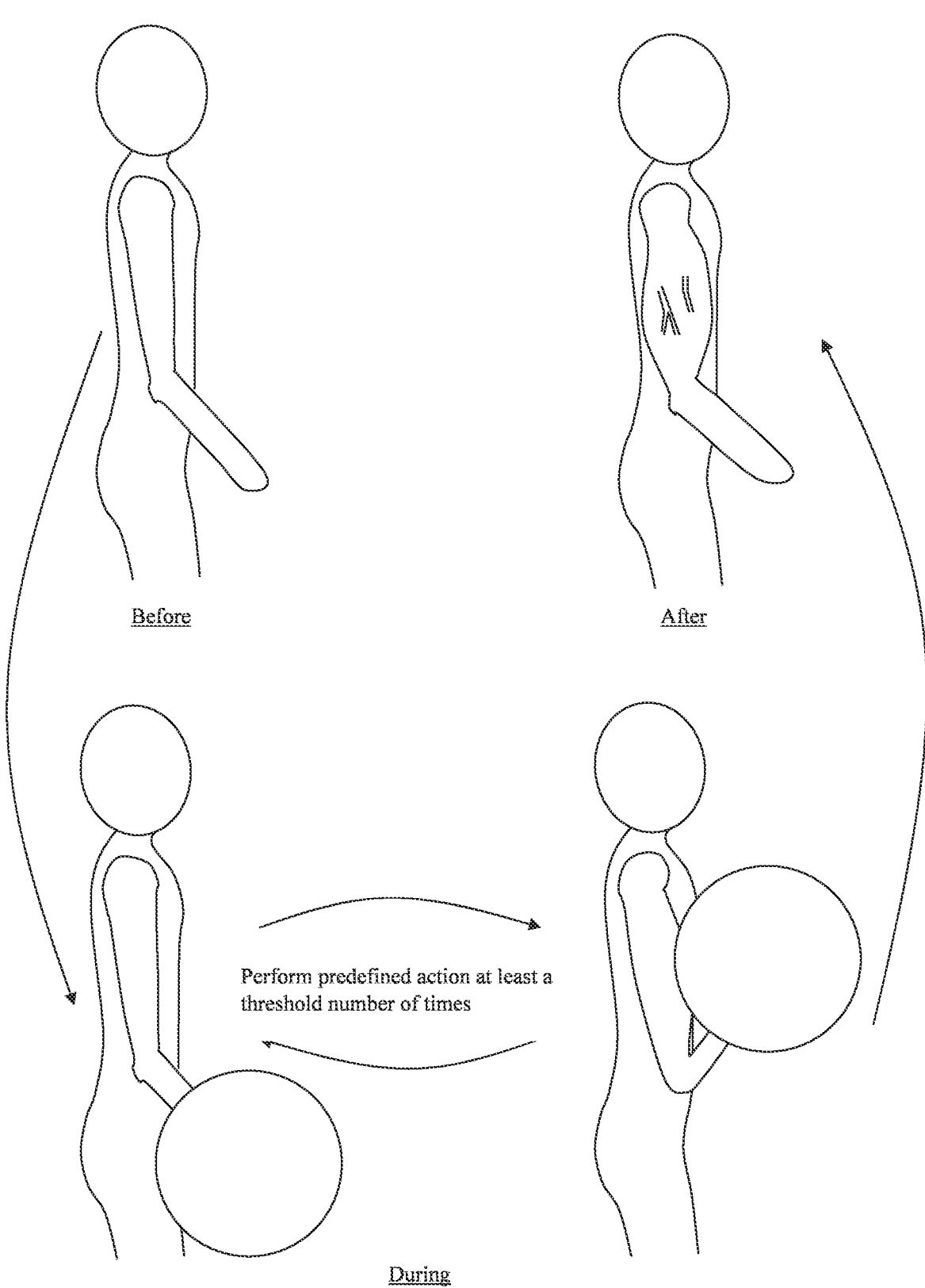
FIG. 4 schematically illustrates the deformation of a mesh of an in-game character in response to the in-game character having performed a predefined action at least a threshold number of times.

Turning now to FIG. 4, in a non-limiting example of the graphics rendering apparatus in operation, the virtual element to be modified (that is, whose mesh is to be deformed) is an in-game character (or at least a part thereof). The user controlling the in-game character (avatar) may wish to make the in-game character perform some exercise in order to upgrade the in-game character's strength/power statistic (that is, its capacity to inflict damage on other characters or move larger/heavier virtual objects), for example. Before the exercise is performed, the avatar has a first geometry/shape, the mesh defining which has been received via first receiving unit 200 (see "Before").

In order to make the avatar perform exercise, the user may provide input signals to the graphics rendering apparatus via a games controller, keyboard and mouse, action/gesture to a camera, or the like, the input signals being received at second receiving unit 202. Consequently, animation unit 204 may cause to the avatar to perform a given predefined action in response to the input signals. For example, animation unit 204 may cause the avatar to perform a bicep curl (see "During") in response to a user performing a bicep curl in front of the camera (the input signal corresponding to a recognition of this action, for example using skeletal analysis), and/or the user pressing, say, the "X" button of their game controller, the input signal corresponding to the depressed "X" button being received at second receiving unit 202.

During the exercise, determination unit 206 may determine whether the given predefined action (bicep curl) has been performed at least a threshold number of times (say, 10, for example) by the avatar (again, see "During"). In response to the avatar having performed at least the threshold number of bicep curls, identification unit 208 may identify a predefined mesh deformation associated with the bicep curl (a mesh deformation applied to an arm of the avatar which makes the arm look more muscular, for example). Deformation unit 210 may subsequently deform the mesh of the avatar in accordance with the identified "muscular arm" deformation, and thus generate a new (subsequent) geometry/shape of the avatar. The mesh defining this subsequent geometry may be used by rendering unit 212 to render the avatar for display (see "After").

Thus, the deformation applied to the avatar provides an indication to users regarding the avatar's statistics; the avatar's strength level may have increased due to performing this exercise, and so deforming the arm of the avatar to make it look more muscular would provide an indication to users that the avatar's strength level has increased.

Mesh Data

In embodiments of the present description, first receiving unit 200 is configured to receive mesh data comprising a mesh that defines a geometry of a virtual element that is comprised within a virtual environment of a video game. In embodiments of the present description, first receiving unit 200 may be one or more data ports, such as data port 60, USB ports, Ethernet® ports, WiFi® ports, Bluetooth® ports, or internal memory I/O ports between ROM, RAM, and/or Graphics memory, and the CPU and/or GPU, or the like.

A virtual element may be one of: at least part of an in-game character (a user-controlled avatar, a non-player character, or the like); at least part of an in-game object (a weapon, food item, clothing, furniture, vehicles, buildings, or the like); and at least part of the virtual environment of the video game (meadow, sand dune, mountain, lake, infrastructure, or the like).

The geometry of a virtual element is often defined by a mesh. Such meshes are typically used to generate images of the virtual element for display at a client device (such as entertainment device 10). In order to generate such images, graphics rendering processes such as texturing, shading, colouring, and the like are typically performed by CPU(s) and/or GPU(s) on the meshes of the virtual elements, resulting in the virtual elements taking on a more realistic/detailed appearance within the subsequently generated image.

A mesh typically comprises a plurality of points and lines in a virtual space. The lines typically connect points together in such a manner so as to create a plurality of tessellating polygons (typically triangles) defining the geometry of the surface of the virtual element. Thus, each point in the mesh corresponds to a vertex of one or more of these tessellating polygons, and each line in the mesh corresponds to an edge of one or more of these tessellating polygons.

As such, the mesh data received at first receiving unit 200 may comprise a plurality of vertices, where each vertex corresponds to a location within a virtual space (a video game's virtual environment, for example). The location of each vertex within the virtual space may be defined using a respective set of virtual space coordinates, for example. As will be appreciated by persons skilled in the art, the virtual space coordinates of a given vertex may be absolute (that is, coordinates defining the location of the given vertex relative to a predefined origin point within the virtual space) or relative (that is, coordinates defining the location of the given vertex relative to one or more other vertices). The coordinate system employed may be Cartesian, cylindrical, spherical, or the like. Moreover, the mesh data may comprise a plurality of polygons, where a perimeter of each polygon comprises three or more lines, where each of the three or more lines connects two of the plurality of vertices. These lines may be defined using connectivity data that indicates which two of the plurality of vertices are connected by a given line.

Optionally, the mesh data may comprise one or more rendering values associated with the mesh. A given rendering value may be associated with one or more of the vertices, and may define a visual aspect of the at least part of the virtual element. For example, a rendering value may be a value defining visual aspects such as, say, the texture, shading, colour, reflectivity, surface decoration, or the like, of at least part of the surface of the virtual element. These rendering values may be used during rendering in order to give the virtual element its final appearance.

Input Signals

In embodiments of the present description, second receiving unit 202 is configured to receive one or more input signals. In embodiments of the present description, second receiving unit 202 may be one or more data ports, such as data port 60, USB ports, Ethernet® ports, WiFi® ports, Bluetooth® ports, or the like. The input signals may be received from one or more of: i. a user input device (game controller, motion controller, mouse, keyboard, or the like); ii. a camera (standalone or comprised within a computer, head mounted display, TV, user input device, or the like); and iii. a microphone (standalone or comprised within a computer, head mounted display, TV, user input device, or the like).

It should be noted that the preceding examples are not exhaustive; persons skilled in the art will appreciate that types of devices operable to transmit input signals in response to user interactions therewith other than those mentioned previously are considered within the scope of the present description.

Predefined Actions

In embodiments of the present description, animation unit 204 is configured to cause the virtual element to perform a given predefined action in response to one or more of the input signals. In embodiments of the present description, animation unit 204 may be one or more CPUs (such as CPU 20, for example) and/or one or more GPUs (such as GPU 30, for example).

As mentioned previously, animation unit 204 may cause a user's avatar to perform a bicep curl in response to the user pressing the "X" button of their game controller, the input signal corresponding to the depressed "X" button being received at second receiving unit 202, for example.

As will be appreciated by persons skilled in the art, a given predefined action may therefore be thought of as one or more predefined motions that the virtual element may perform in response to a given input signal (jumping, running, crawling, creeping, swinging a melee weapon, throwing a projectile, or the like). It should be noted that the correspondences/mappings between inputs signals and predefined actions may be immutable or dynamically adjustable, and/or may be predefined or user-defined. Moreover, such mappings may or may not be specific to the given virtual element or the given video game. As a corollary, a given predefined action may or may not be specific to the given virtual element or given video game. For example, jumping may be a "generic" action which most of the in-game characters can perform (albeit potentially in their own way; height reached and limb motion during the jump may vary with each character), whereas casting a magical spell may only be performable by wizards. In another example, sprinting may only be performable by in-game characters that have an above-threshold stamina level.

In any case, it is desirable to modify the appearance of the virtual element (that is, deform the virtual element's mesh) after the virtual element has performed a given predefined action for an above-threshold number of times, and thereby provide an indication of the current state of the virtual element to the other users of the video game.

Therefore, in embodiments of the present description, determination unit 206 is configured to determine whether the virtual element has performed the given predefined action at least a threshold number of times. In embodiments of the present description, determination unit 206 may be one or more CPUs (such as CPU 20, for example) and/or one or more GPUs (such as GPU 30, for example).

As will be appreciated by persons skilled in the art, the threshold number of times for which the given predefined action is performed may or may not be specific to the given predefined action, the given virtual element, or the given video game. Moreover, the threshold number of times may be immutable or dynamically adjustable, and/or may be predefined, linked to another setting such as game difficulty, or user-defined.

Determination unit 206 may detect individual performances of the given predefined action based on metadata associated with the virtual element. For example, each predefined action may be associated with a respective flag, and animation unit 208 may be configured to transmit the given flag with which the given predefined action is associated in response to the given predefined action being performed by the virtual element. Subsequently, determination unit 206 may be configured to receive the given flag, and may be configured to determine whether the given flag has been received thereat at least the threshold number of times.

Alternatively or in addition, determination unit 206 may detect individual performances of the given predefined action by analysing the video data output by the video game. For example, determination unit 206 may comprise an action recognition model that recognises the virtual element in the video data, and may recognise the motion of parts of the virtual element. The action recognition model may be any form of object recognition/computer vision software commonly known to persons skilled in the art. Alternatively or in addition, the action recognition model may be a trained machine learning model that has been trained to recognise objects and motions thereof using training video data.

Optionally, determination unit 206 may be configured to determine whether the virtual element has performed the given predefined action at least the threshold number of times within a first threshold period of time.

As will be appreciated by persons skilled in the art, the first threshold period of time may serve to reduce or eliminate false positive determinations that the virtual element's mesh should be deformed. For example, during a video game session, the user may make their avatar perform 12 bicep curls, the last one being performed 2 hours after the first one, and the remaining 10 being sporadically performed over the course of those 2 hours. Such timings of the performances of these bicep curls would not typically be considered to amount to an attempt at upgrading the avatar's strength, but rather the mere movement of objects obstructing the path of the avatar. By implementing the first threshold period of time, determination unit 206 would be able to distinguish between such (and other) scenarios; if the 12 biceps curls were all performed in less than, say, 1 minute, for example, then determination unit 206 may more accurately determine that the avatar's mesh should be deformed.

Like with the threshold number of times for which the given predefined action is performed, the first threshold period of time may or may not be specific to the given predefined action, the given virtual element, or the given video game. Moreover, the threshold period of time may be immutable or dynamically adjustable, and/or may be predefined or user-defined. Moreover, it should be noted that the first period of time may correspond to a period of real-world time, in-game time, or clock time associated with animation unit 204.

In any case, determination unit 206 determines whether the virtual element has performed the given predefined action for an above-threshold number of times, and thereby determines whether the virtual element's mesh should be deformed.

Alternatively or in addition, the virtual element may optionally be required to perform the given predefined action in one or more specific locations or in one or more predefined states to have the effect, for example when at a rest-camp in-game, or between battle campaigns. This can facilitate allowing inputs to be context sensitive—hence pressing 'X' can cause a fighting action by default, but causes a bicep curl between battles, or when in a training arena, or the like.

Predefined Mesh Deformations

As mentioned previously, it is desirable to modify the appearance of the virtual element after the virtual element has performed a given predefined action for an above-threshold number of times, and thereby provide an indication of the current state of the virtual element to the other users of the video game.

Therefore, in embodiments of the present description, identification unit 208 is configured to identify one or more predefined mesh deformations associated with the given predefined action if the virtual element has performed the given predefined action at least the threshold number of times. In embodiments of the present description, identification unit 208 may be one or more CPUs (such as CPU 20, for example) and/or one or more GPUs (such as GPU 30, for example).

A given predefined mesh deformation may comprise data indicating a respective new location within the virtual space for one or more vertices comprised within a given one or more subsets of vertices of the mesh. For example, a given predefined mesh deformation may comprise one or more sets of new virtual space coordinates for one or more of the vertices comprised within the given subset(s), and/or may comprise one or more difference values that represent a respective difference between the current virtual space coordinates of one or more vertices within the subset(s) and the new virtual space coordinates of the one or more vertices within the subset(s).

Figure 5:
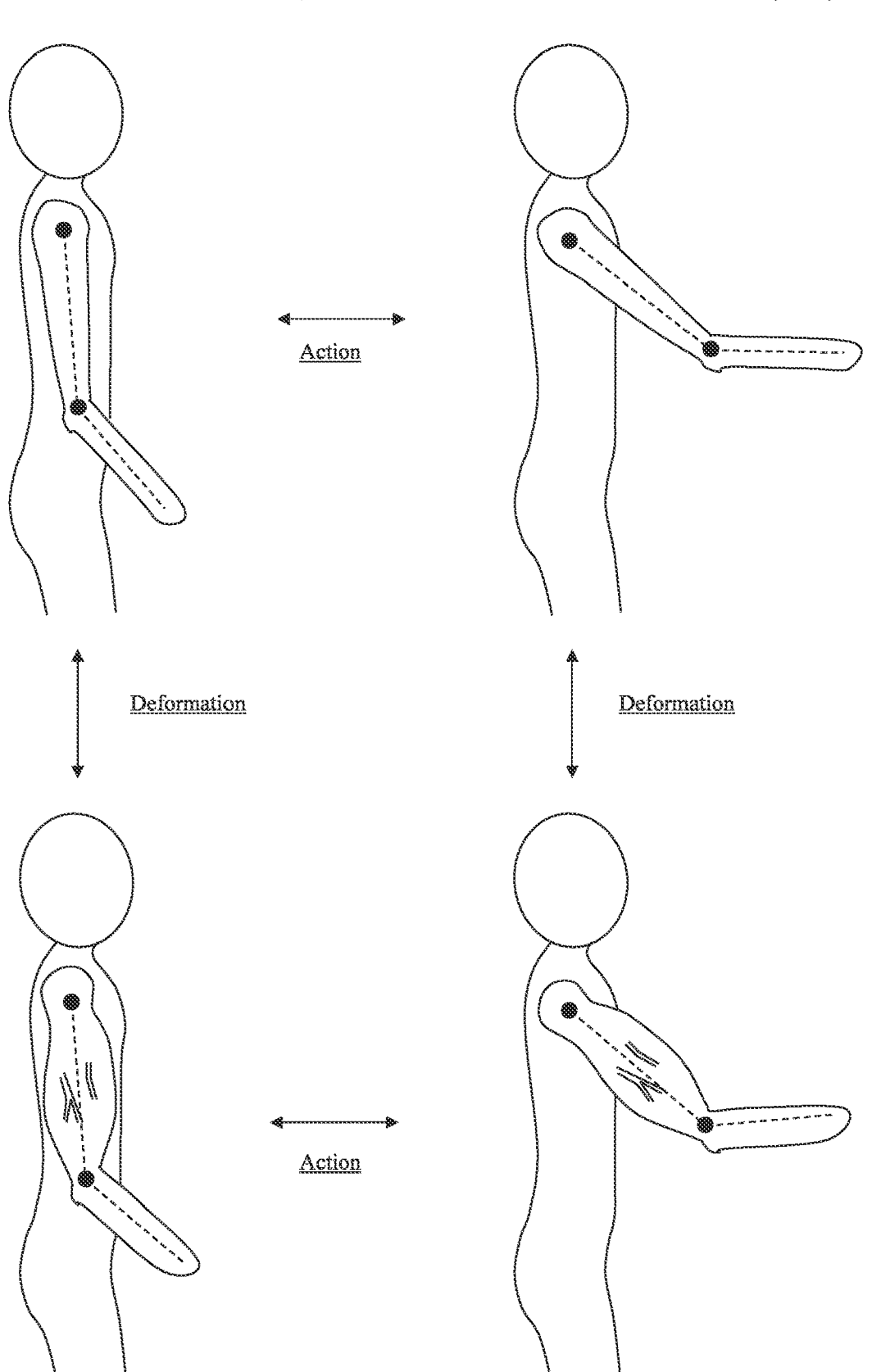
FIG. 5 schematically illustrates in-game character actions and mesh deformations applied to the in-game character's mesh.

While predefined mesh deformations and predefined actions are similar in that they both result in changes in the locations of vertices and/or polygons of the mesh within the virtual space (virtual environment), the following distinctions may be made therebetween with reference to FIG. 5.

The predefined virtual element motions that define a given predefined action are typically generated (either manually or automatically) with reference to a so-called "rig". A rig typically defines the skeletal structure of a given virtual element, and is typically enveloped in the mesh. The rig typically comprises one or more bones and two or more joints, where each joint corresponds to a location within the virtual space and each bone corresponds to a line connecting two of the joints. A given subset of the mesh is typically associated with a given bone such that when the location and/or orientation of the given bone within the virtual space is changed, the location and/or orientation of the associated given subset of mesh is changed in like manner, the subset of mesh still enveloping the bone all the while. An example rig of an arm of an in-game character is depicted in FIG. 5, where joints are represented by black dots and bones are represented with dashed lines. Moreover, the subset(s) of mesh defining the arm(s) of the in-game character are associated with the arm bones in the aforementioned manner.

As can be seen in FIG. 5, the predefined action being performed by the in-game character is a simple raising of one or both of its arms (see "action"). As will be appreciated by persons skilled in the art, this predefined action, while involving a change in location of the vertices and/or polygons that define the geometry of the in-game character's arm within the virtual space, does not modify the respective relative distances of those vertices and/or polygons from the bones enveloped within the in-game character's arm. In contrast, a predefined mesh deformation applied to the arm modifies the respective relative distances of at least some of the vertices and/or polygons of the arm from the arm bones (see "deformation"). In other words, a deformation of the mesh changes the relative positions of at least some vertices/polygons in the mesh even when the rig does not move.

A given predefined mesh deformation may be associated with a given predefined action by virtue of the subsets of the virtual element's mesh which are affected by both. For example, the bicep curl depicted in the "during" stage of FIG. 4 involves motion of one or both of arms of the in-game character. Therefore, a given predefined mesh deformation associated with the bicep curl may be one that is to be applied to the arm(s) of the in-game character, for example.

In embodiments where determination unit 206 is configured to determine whether the virtual element has performed the given predefined action at least the threshold number of times within a first threshold period of time, identification unit 208 may be configured to identify the one or more predefined mesh deformations associated with the given predefined action if the virtual element has performed the given predefined action at least the threshold number of times within the first threshold period of time. The benefits of implementing this first threshold period of time have been discussed with respect to determination unit 206.

Alternatively or in addition, in embodiments of the present description, identification unit 208 may be configured to identify one or more other predefined mesh deformations associated with the given predefined action if the virtual element has not performed the given predefined action at least the threshold number of times within a second threshold period of time.

In certain games, a particular in-game character may have its in-game statistics (strength level, for example) downgraded if the character has not performed the requisite amount of activity within another (second) period of time (2 days, for example). In order to portray such a downgrade visually (that is, in the appearance of the in-game character), identification unit 208 may identify one or more other predefined mesh deformations in the event that the character does not perform the requisite activity within the second period of time.

Like with the predefined mesh deformations, a given other predefined mesh deformation may be associated with a given predefined action by virtue of the subsets of the virtual element's mesh which are affected by both. For example, the bicep curl depicted in the "during" stage of FIG. 4 involves motion of one or both of arms of the in-game character. Therefore, a given other predefined mesh deformation associated with the bicep curl may be one that is to be applied to the arm(s) of the in-game character, for example. However, the given other predefined mesh deformation (that makes the arm(s) appear less muscular, for example) is applied when the in-game character has not performed the requisite number of bicep curls within the second period of time, whereas a given predefined mesh deformation (that makes the arm(s) appear more muscular, for example). It will be appreciated that the other predefined mesh deformation may be a previously used predefined mesh deformation in a sequence of two or more mesh deformations that track progressive changes to the mesh as the predefined action either is or is not performed within the requisite periods.

As will be appreciated by persons skilled in the art, in embodiments where both the first and second threshold periods of time are implemented, the second period of time may or may not equal the first period of time discussed hereinbefore. Notably, if the second threshold period of time is longer in duration than the first period of time, then a way to maintain the current appearance of the virtual element may arise (in order to reflect a plateau in the in-game character's statistics). For example, if the in-game character performs an above-threshold number of bicep curls within the second period of time but outside of the first threshold period of time, then no predefined mesh deformations may be identified by identification unit 208.

Like with the first period of time, the second threshold period of time may or may not be specific to the given predefined action, the given virtual element, or the given video game. Moreover, the second threshold period of time may be immutable or dynamically adjustable, and/or may be predefined or user-defined. Moreover, the second period of time may correspond to a period of real-world time, in-game time, or clock time associated with identification unit 206.

As will be appreciated by persons skilled in the art, the second threshold period of time is not necessarily the only way to determine that the virtual element's mesh should be deformed using one or more other predefined mesh deformations. For example, identification unit 208 may be configured to identify one or more other predefined mesh deformations associated with the given predefined action if the virtual element has not performed the given predefined action at least the threshold number of times, or has not performed the given predefined action at least a second threshold number of times lower than the (first) threshold of times.

Alternatively or in addition, in embodiments where the mesh data comprises one or more rendering values associated with the mesh, one or more of the predefined mesh deformations comprise one or more subsequent rendering values.

These subsequent rendering values may be used to provide further definition to the new appearance of the virtual element. For example, whereas the predefined mesh deformations may result in the avatar taking on a more muscular physique, the subsequent rendering values may be used to provide contouring and toning to the "skin" of the character, and thereby provide a more realistic muscularity to the virtual element's appearance (that is, a more accurate indication to other users of the video game regarding of the strength level of the avatar).

In any case, once the predefined mesh deformations have been identified by identification unit 208, the virtual element' mesh may be deformed accordingly by deformation unit 210.

Subsequent Mesh Data

As mentioned previously, it is desirable to modify the appearance of the virtual element after the virtual element has performed a given predefined action for an above-threshold number of times, and thereby provide an indication of the current state of the virtual element to the other users of the video game.

Therefore, in embodiments of the present description, deformation unit 210 is configured to deform one or more subsets of the mesh in accordance with one or more of the predefined mesh deformations, and at least in part thereby generate subsequent mesh data comprising a subsequent mesh that defines a subsequent geometry of the virtual element. In embodiments of the present description, deformation unit 210 may be one or more CPUs (such as CPU 20, for example) and/or one or more GPUs (such as GPU 30, for example).

That is to say, the predefined mesh deformations identified by identification unit 208 may be applied to the virtual element's mesh, and thus generate a new (subsequent) mesh for that virtual element.

In embodiments where identification unit 208 is configured to identify one or more other predefined mesh deformations associated with the given predefined action if the virtual element has not performed the given predefined action at least the threshold number of times within a second threshold period of time; deformation unit 206 may be configured to deform the one or more subsets of the mesh in accordance with one or more of the other predefined mesh deformations, and at least in part thereby generate the subsequent mesh data. The benefits of implementing this second threshold period of time have been discussed with respect to identification unit 208.

A given (or given other) predefined mesh deformation may be applied in its entirety, that is, applied to each vertex within the given subset of the mesh to which the given predefined mesh deformation is applicable. Alternatively, the predefined mesh deformations may only be applied to one or more of the vertices within the given subset.

In any case, the locations of at least one or more vertices within the given subset may be modified such that they are identical to those indicated by the data comprised within the predefined mesh deformation.

Alternatively, deformation unit 210 may be configured to deform the one or more subsets of the mesh in dependence upon one or more weighting coefficients, wherein each weighting coefficient defines an extent to which one or more of the subsets are deformed in accordance with a respective predefined mesh deformation. As an example, a given predefined mesh deformation may comprise data indicating that the ordinate (y-direction) value of a given vertex is to be increased by 6 units. That is to say, the given vertex is to be moved 6 units in the -direction) value of a given vertex is to be increased by 6 units. That is to say, the data indicates that the given vertex is to be moved 6 units in the y-direction. However, if a weighting coefficient of, say, 0.7 is associated with the given predefined mesh deformation, then this may be applied to the aforementioned 6 units to yield a value of 4.2 units. Thus, the given vertex may be moved 4.2 units in the aforementioned 6 units to yield a value of 4.2 units. Thus, the given vertex may be moved 4.2 units in the y-direction instead of 6 units.

As will be appreciated by persons skilled in the art, a given weighting coefficient may be associated with a given vertex, a given polygon, or with a given one or more subsets of the mesh. Thus, as will be appreciated by persons skilled in the art, the weighting coefficient may be used to limit the extent to which a predefined mesh deformation that is to be applied to the given vertex/polygon/subset(s) modifies the given vertex/polygon/subset(s). Moreover, a given weighting coefficient may be immutable or dynamically adjustable, and/or may be predefined or user-defined.

As an example of dynamically adjustable weighting coefficients, one or more of the weighting coefficients may be responsive to one or more aspects associated with the virtual element.

An aspect of the virtual element may be a location within the virtual environment at which the virtual element is situated, for example. For example, the weighting coefficient(s) of an in-game character situated in a desert landscape may be lower than that when in-game character is situated in an urban landscape, as the character may not be able to upgrade as much in the desert as they could in the city due to environmental conditions imposed on the character.

Alternatively or in addition, the one or more aspects associated with the virtual element comprise at least one of: i. a physiological characteristic associated with the virtual element; ii. an emotional state associated with the virtual element; and iii. an average elapsed time between performances of the given predefined action.

A physiological characteristic may be a character statistic (strength level, health level, stamina level, magic level, hunger/thirst/rest level or the like), an age, a gender, a species (human, elf, dwarf, alien, or the like), a character type (wizard, knight, sniper, machine gunner, or the like), and the like, for example. Regarding an emotional state associated with the virtual element, there may be some in-game characters whose strength level increases significantly when they are in an angry/rage state (such as Kratos from the God of War series of video games). As such, the weighting coefficient may be adjusted in response to the character becoming angry (or indeed taking on any particular emotion that warrants such weighting coefficient adjustment) such that when the character performs the predefined actions in this emotional state, their mesh may be deformed to a different extent. Regarding an average elapsed time between performances of the given predefined action, it may be that upgrades to an in-game character's strength level is dependent upon how rapidly the character performs the predefined actions. Therefore, it may be beneficial to adjust the weighting coefficients such that the character's mesh may be deformed to an extent that is also dependently upon how rapidly the character performs the predefined actions.

If predefined mesh deformations are provided for reaching N repetitions of an action, then dynamically adjustable weighting coefficients may optionally be used to gradually apply the respective predefined mesh deformation rather than apply it all at once. As a non-limiting example, assume that N bicep curls are the threshold to fully implement a mesh deformation to show stronger arms. In one instance, this change could be applied once the ten bicep curls have been performed. Alternatively, a weighting could be increased by 1/N for each curl so that the mesh deforms progressively over the N repetitions until the full deformation is achieved at the threshold number. In this way continuous progress can be shown, whilst still only needing to define meshes as waypoints within the character's physical development.

Alternatively or in addition, in embodiments where one or more of the predefined mesh deformations comprises one or more subsequent rendering values, deformation unit 210 may be configured to apply the one or more subsequent rendering values to the mesh, and at least in part thereby generate the subsequent mesh data. The benefits of doing so have been discussed with respect to identification unit 208.

As in-game characters are typically upgraded in a cumulative manner, it may be beneficial to provide a cumulative deforming of the character's mesh in order that the appearance of the character more accurately reflects the cumulative development of the character's statistics. That is to say, it may be desirable to deform the subsequent mesh data in order to generate further subsequent mesh data.

Therefore, deformation unit 210 may be configured to deform one or more subsets of the subsequent mesh, and at least in part thereby generate further subsequent mesh data that defines a further subsequent geometry of the virtual element, wherein the deformation unit 210 may be configured to do so in accordance with whichever one or more predefined mesh deformations are identified by the identification unit in response to the determination unit determining whether the virtual element has performed a particular predefined action at least a particular threshold number of times.

As will be appreciated by persons skilled in the art, the predefined action that is performed in order to generate the further subsequent mesh data need not be the same as that performed in order to generated the subsequent mesh data. Likewise, the threshold number of performances of the predefined action that is used to determine whether the further subsequent mesh data is to be generated need not be the same as that used to determine whether the subsequent mesh data should have been generated.

In order to ensure that such cumulative deformations may be carried out (or otherwise preserve the data defining the new appearance of the virtual element), in embodiments of the present description, the graphics rendering apparatus may comprise storage unit 214 that is configured to store the subsequent mesh data. In embodiments of the present description, storage unit 214 may be a system memory such as RAM 40, ROM, or the like, or may be a storage memory such as HDD, SSD 50, CD, Floppy Disk, or the like.

In any case, once deformation unit 210 has deformed the mesh of the virtual element, the virtual element may be rendered for display, and thereby provide an indication of the current state of the virtual element to the other users of the video game.

Therefore, in embodiments of the present description, rendering unit 212 is configured to render the virtual element based on the subsequent mesh data. In embodiments of the present description, rendering unit 212 may be one or more CPUs (such as CPU 20, for example) and/or one or more GPUs (such as GPU 30, for example).

Variants

As was noted previously herein, the above techniques may be applied not just to the user's own character but to other elements of the environment. Typically in these cases the user still performs an action but the affect will typically be indirect within the environment. For example a road may form ruts when repeatedly driven down in a particular vehicle, optionally making it difficult for other vehicles to use the road. Similarly a user may train their character against a non-player character team mate, and in the process similarly enhance the non-player's stats through repeated (re-)actions to the character; in this way a user can invest effort in the progress of their team, whilst also investing in their own character. The same principle can apply to any repeated interaction with a character, object, or environmental feature, where this technique is implemented.

In addition to increasing stats through repeated actions, typically in games player characters take damage. Optionally such damage may cause virtual injury for short periods. A particular injury may optionally prevent a particular action for a period of time, potentially causing the character to become weaker and resulting in the character mesh reverting to a previous or other mesh deformation.

SUMMARY EMBODIMENT(S)

Hence, in a summary embodiment of the present description a graphics rendering apparatus comprises: first receiving unit 200 configured to receive mesh data comprising a mesh that defines a geometry of a virtual element that is comprised within a virtual environment of a video game; second receiving unit 202 configured to receive one or more input signals; animation unit 204 configured to cause the virtual element to perform a given predefined action in response to one or more of the input signals; determination unit 206 configured to determine whether the virtual element has performed the given predefined action at least a threshold number of times; identification unit 208 configured to identify one or more predefined mesh deformations associated with the given predefined action if the virtual element has performed the given predefined action at least the threshold number of times; deformation unit 210 configured to deform one or more subsets of the mesh in accordance with one or more of the predefined mesh deformations, and at least in part thereby generate subsequent mesh data comprising a subsequent mesh that defines a subsequent geometry of the virtual element; and rendering unit 212 configured to render the virtual element based on the subsequent mesh data, as described elsewhere herein.

It will be apparent to persons skilled in the art that variations in the aforementioned apparatus as described and claimed herein are considered within the scope of the present invention, including but not limited to that:

In an instance of the summary embodiment, determination unit 206 is configured to determine whether the virtual element has performed the given predefined action at least the threshold number of times within a first threshold period of time; and identification unit 208 is configured to identify the one or more predefined mesh deformations associated with the given predefined action if the virtual element has performed the given predefined action at least the threshold number of times within the first threshold period of time, as described elsewhere herein;

In an instance of the summary embodiment, identification unit 208 is configured to identify one or more other predefined mesh deformations associated with the given predefined action if the virtual element has not performed the given predefined action at least the threshold number of times within a second threshold period of time; and deformation unit 210 is configured to deform the one or more subsets of the mesh in accordance with one or more of the other predefined mesh deformations, and at least in part thereby generate the subsequent mesh data, as described elsewhere herein;

In an instance of the summary embodiment, deformation unit 210 is configured to deform the one or more subsets of the mesh in dependence upon one or more weighting coefficients, wherein each weighting coefficient defines an extent to which one or more of the subsets are deformed in accordance with a respective predefined mesh deformation, as described elsewhere herein;

In this instance, optionally one or more of the weighting coefficients are responsive to one or more aspects associated with the virtual element, as described elsewhere herein;

In this instance, optionally the one or more aspects associated with the virtual element comprise at least one of: i. a physiological characteristic associated with the virtual element; ii. an emotional state associated with the virtual element; and iii. an average elapsed time between performances of the given predefined action, as described elsewhere herein;

In an instance of the summary embodiment, the mesh data comprises one or more rendering values associated with the mesh; one or more of the predefined mesh deformations comprise one or more subsequent rendering values; and deformation unit 210 is configured to apply to the one or more subsequent rendering values to the mesh, and at least in part thereby generate the subsequent mesh data, as described elsewhere herein;

In an instance of the summary embodiment, the graphics rendering apparatus comprises storage unit 214 that is configured to store the subsequent mesh data, as described elsewhere herein; and In an instance of the summary embodiment, deformation unit 210 is configured to deform one or more subsets of the subsequent mesh, and at least in part thereby generate further subsequent mesh data that defines a further subsequent geometry of the virtual element, wherein deformation unit 210 is configured to do so in accordance with whichever one or more predefined mesh deformations are identified by the identification unit in response to the determination unit determining whether the virtual element has performed a particular predefined action at least a particular threshold number of times, as described elsewhere herein.

Graphics Rendering Method

Figure 6:
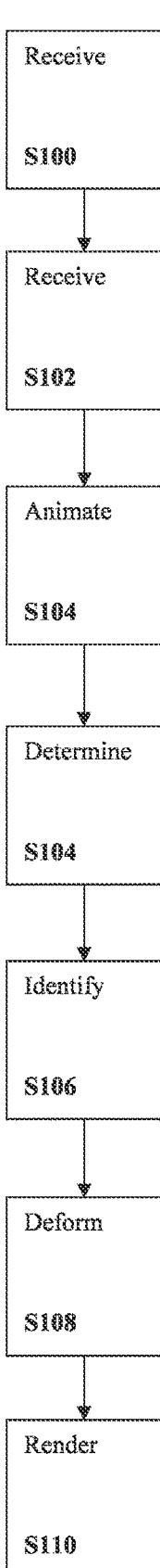
FIG. 6 schematically illustrates a graphics rendering method according to embodiments of the present description.

Turning now to FIG. 6, a graphics rendering method comprises the following steps: Step S100: receiving mesh data comprising a mesh that defines a geometry of a virtual element that is comprised within a virtual environment of a video game, as described elsewhere herein. Step S102: receiving one or more input signals, as described elsewhere herein. Step S104: causing the virtual element to perform a given predefined action in response to one or more of the input signals, as described elsewhere herein. Step S106: determining whether the virtual element has performed the given predefined action at least a threshold number of times, as described elsewhere herein. Step S108: deforming one or more subsets of the mesh in accordance with one or more of the predefined mesh deformations, and at least in part thereby generate subsequent mesh data comprising a subsequent mesh that defines a subsequent geometry of the virtual element, as described elsewhere herein. Step S110: rendering the virtual element based on the subsequent mesh data, as described elsewhere herein.

It will be apparent to a person skilled in the art that variations in the above method corresponding to operation of the various embodiments of the apparatus as described and claimed herein are considered within the scope of the present invention.

It will be appreciated that the above methods may be carried out on conventional hardware (such as entertainment device 10) suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the present disclosure may be implemented in accordance with any one or more of the following numbered clauses:

1. A graphics rendering apparatus, comprising: a first receiving unit configured to receive mesh data comprising a mesh that defines a geometry of a virtual element that is comprised within a virtual environment of a video game; a second receiving unit configured to receive one or more input signals; an animation unit configured to cause the virtual element to perform a given predefined action in response to one or more of the input signals; a determination unit configured to determine whether the virtual element has performed the given predefined action at least a threshold number of times; an identification unit configured to identify one or more predefined mesh deformations associated with the given predefined action if the virtual element has performed the given predefined action at least the threshold number of times; a deformation unit configured to deform one or more subsets of the mesh in accordance with one or more of the predefined mesh deformations, and at least in part thereby generate subsequent mesh data comprising a subsequent mesh that defines a subsequent geometry of the virtual element; and a rendering unit configured to render the virtual element based on the subsequent mesh data.

2. A graphics rendering apparatus according to clause 1, wherein: the determination unit is configured to determine whether the virtual element has performed the given predefined action at least the threshold number of times within a first threshold period of time; and the identification unit is configured to identify the one or more predefined mesh deformations associated with the given predefined action if the virtual element has performed the given predefined action at least the threshold number of times within the first threshold period of time.

3. A graphics rendering apparatus according to any preceding clause, wherein: the identification unit is configured to identify one or more other predefined mesh deformations associated with the given predefined action if the virtual element has not performed the given predefined action at least the threshold number of times within a second threshold period of time; and the deformation unit is configured to deform the one or more subsets of the mesh in accordance with one or more of the other predefined mesh deformations, and at least in part thereby generate the subsequent mesh data.

4. A graphics rendering apparatus according to any preceding clause, wherein the deformation unit is configured to deform the one or more subsets of the mesh in dependence upon one or more weighting coefficients, wherein each weighting coefficient defines an extent to which one or more of the subsets are deformed in accordance with a respective predefined mesh deformation.

5. A graphics rendering apparatus according to clause 4, wherein one or more of the weighting coefficients are responsive to one or more aspects associated with the virtual element.

6. A graphics rendering apparatus according to clause 5, wherein the one or more aspects associated with the virtual element comprise at least one of: i. a physiological characteristic associated with the virtual element; ii. an emotional state associated with the virtual element; and iii. an average elapsed time between performances of the given predefined action.

7. A graphics rendering apparatus according to any preceding clause, wherein: the mesh data comprises one or more rendering values associated with the mesh; one or more of the predefined mesh deformations comprise one or more subsequent rendering values; and the deformation unit is configured to apply the one or more subsequent rendering values to the mesh, and at least in part thereby generate the subsequent mesh data.

8. A graphics rendering apparatus according to any preceding clause, wherein: the deformation unit is configured to deform one or more subsets of the subsequent mesh, and at least in part thereby generate further subsequent mesh data that defines a further subsequent geometry of the virtual element, wherein the deformation unit is configured to do so in accordance with whichever one or more predefined mesh deformations are identified by the identification unit in response to the determination unit determining whether the virtual element has performed a particular predefined action at least a particular threshold number of times.

9. A graphics rendering apparatus according to any preceding clause, comprising a storage unit configured to store the subsequent mesh data.

10. A graphics rendering method, comprising: receiving mesh data comprising a mesh that defines a geometry of a virtual element that is comprised within a virtual environment of a video game; receiving one or more input signals; causing the virtual element to perform a given predefined action in response to one or more of the input signals; determining whether the virtual element has performed the given predefined action at least a threshold number of times; identifying one or more predefined mesh deformations associated with the given predefined action if the virtual element has performed the given predefined action at least the threshold number of times; deforming one or more subsets of the mesh in accordance with one or more of the predefined mesh deformations, and at least in part thereby generate subsequent mesh data comprising a subsequent mesh that defines a subsequent geometry of the virtual element; and rendering the virtual element based on the subsequent mesh data.

11. A computer program comprising computer executable instructions adapted to cause a computer system to perform the method of clause 10.

12. A non-transitory, computer-readable storage medium having stored thereon the computer program of clause 11.

The invention claimed is:

1. A method, comprising:
receiving mesh data associated with a virtual element within a virtual environment of a video game, the mesh data comprising a geometry of the virtual element;
receiving, from a connected device, one or more input signals to control an action of the virtual element;
causing the virtual element to perform the action using data representative of one or more of the received input signals;
determining that the virtual element has performed the action at least a threshold number of times;
in response to determining that the virtual element has performed the action at least the threshold number of times using the data representative of one or more of the received input signals, identifying one or more predefined mesh deformations associated with the action;
applying, one or more deformations to the received mesh data, using the one or more identified predefined mesh deformations while maintaining connectivity of the received mesh data, wherein the applied deformations to the received mesh data change a geometry of the virtual element; and
rendering the virtual element based on the applied deformations.

2. The method of claim 1, further comprising:
determining that the virtual element has not performed the action at least the threshold number of times within a threshold period of time;
in response to determining that the virtual element has not performed the action at least the threshold number of times within the threshold period of time using one or more of the received input signals, identifying one or more other predefined mesh deformations associated with the action; and
applying one or more other deformations to the received mesh data using the one or more identified other predefined mesh deformations while maintaining the connectivity of the received mesh data.

3. The method of claim 1, wherein the one or more deformations are applied using one or more weighting coefficients, wherein the one or more weighting coefficients defines an amount of one or more regions in the received mesh data are deformed in accordance with a respective predefined mesh deformation.

4. The method of claim 3, wherein the one or more weighting coefficients are generated in accordance with the deformation to the geometry of the virtual element.

5. The method of claim 4, wherein the geometry of the virtual element comprises at least one of (i) a physiological characteristic associated with the virtual element, (ii) an emotional state associated with the virtual element, or (iii) an average elapsed time between performances of the action.

6. The method of claim 1, wherein the mesh data comprises one or more rendering values, the one or more predefined mesh deformations comprise one or more rendering values, and applying the one or more deformations to the received mesh data comprises applying the one or more rendering values to the mesh data to alter the geometry of the virtual element.

7. The method of claim 1, wherein applying the one or more deformations to the received mesh data using the one or more identified predefined mesh deformations while maintaining connectivity of the received mesh data comprises adjusting a position of one or more vertices on the received mesh data using the one or more identified predefined mesh deformations, wherein the one or more identified predefined mesh deformations comprises a magnitude of the adjustment position and a direction of the adjustment position.

8. The method of claim 1, comprising storing the deformed mesh data in a storage unit.

9. A non-transitory machine-readable storage medium which stores computer software which, when executed by a computer, causes the computer to perform operations comprising:
receiving mesh data associated with a virtual element within a virtual environment of a video game, the mesh data comprising a geometry of the virtual element that is comprised within a virtual environment of a video game;
receiving, from a connected device, one or more input signals to control an action of the virtual element;
causing the virtual element to perform the action using data representative of one or more of the received input signals;
determining that the virtual element has performed the action at least a threshold number of times;
in response to determining that the virtual element has performed the action at least the threshold number of times using the data representative of one or more of the received input signals, identifying one or more predefined mesh deformations associated with the action;
applying, one or more deformations to the received mesh data, using the one or more identified predefined mesh deformations while maintaining connectivity of the received mesh data, wherein the applied deformations to the received mesh data change a geometry of the virtual element; and
rendering the virtual element based on the applied deformations.

10. The non-transitory machine-readable storage medium according to claim 9, further comprising:
determining that the virtual element has not performed the action at least the threshold number of times within a threshold period of time;
in response to determining that the virtual element has not performed the action at least the threshold number of times within the threshold period of time using one or more of the received input signals, identifying one or more other predefined mesh deformations associated with the action; and applying one or more other deformations to the received mesh data using the one or more identified other predefined mesh deformations while maintaining the connectivity of the received mesh data.

11. The non-transitory machine-readable storage medium according to claim 9, wherein the one or more deformations are applied using one or more weighting coefficients, wherein the one or more weighting coefficients defines an amount of one or more regions in the received mesh data are deformed in accordance with a respective predefined mesh deformation.

12. The non-transitory machine-readable storage medium according to claim 11, wherein the one or more weighting coefficients are generated in accordance with the deformation to the geometry of the virtual element.

13. The non-transitory machine-readable storage medium according to claim 12, wherein the geometry of the virtual element comprises at least one of (i) a physiological characteristic associated with the virtual element, (ii) an emotional state associated with the virtual element, or (iii) an average elapsed time between performances of the action.

14. The non-transitory machine-readable storage medium according to claim 9, wherein the mesh data comprises one or more rendering values, the one or more predefined mesh deformations comprise one or more rendering values, and applying the one or more deformations to the received mesh data comprises applying the one or more rendering values to the mesh data to alter the geometry of the virtual element.

15. The non-transitory machine-readable storage medium according to claim 9, wherein applying the one or more deformations to the received mesh data using the one or more identified predefined mesh deformations while maintaining connectivity of the received mesh data comprises adjusting a position of one or more vertices on the received mesh data using the one or more identified predefined mesh deformations, wherein the one or more identified predefined mesh deformations comprises a magnitude of the adjustment position and a direction of the adjustment position.

16. The non-transitory machine-readable storage medium according to claim 9, comprising storing the deformed mesh data in a storage unit.

17. A system comprising:

one or more computers and one or more storage devices storing instructions that are operable, when executed by the one or more computers, to cause the one or more computers to perform operations comprising:

receiving mesh data associated with a virtual element within a virtual environment of a video game, the mesh data comprising a geometry of the virtual element;

receiving, from a connected device, one or more input signals to control an action of the virtual element;

causing the virtual element to perform the action using data representative of one or more of the received input signals;

determining that the virtual element has performed the action at least a threshold number of times;

in response to determining that the virtual element has performed the action at least the threshold number of times using the data representative of one or more of the received input signals, identifying one or more predefined mesh deformations associated with the action;

applying, one or more deformations to the received mesh data, using the one or more identified predefined mesh deformations while maintaining connectivity of the received mesh data, wherein the applied deformations to the received mesh data change a geometry of the virtual element; and rendering the virtual element based on the applied deformations.

18. The system of claim 17, further comprising:

determining that the virtual element has not performed the action at least the threshold number of times within a threshold period of time;

in response to determining that the virtual element has not performed the action at least the threshold number of times within the threshold period of time using one or more of the received input signals, identifying one or more other predefined mesh deformations associated with the action; and applying one or more other deformations to the received mesh data using the one or more identified other predefined mesh deformations while maintaining the connectivity of the received mesh data.

19. The system of claim 17, wherein the one or more deformations are applied using one or more weighting coefficients, wherein the one or more weighting coefficients defines an amount of one or more regions in the received mesh data are deformed in accordance with a respective predefined mesh deformation.

20. The system of claim 19, wherein the one or more weighting coefficients are generated in accordance with the deformation to the geometry of the virtual element.

* * * * *